(12) United States Patent
Habermehl et al.

(10) Patent No.: US 6,494,322 B1
(45) Date of Patent: Dec. 17, 2002

(54) ARROW HEAD SCREWSTRIP

(76) Inventors: G. Lyle Habermehl, 436 Calvert Dr., Gallatin, TN (US) 37066; Troy D. Hale, 105 Cline Ave., Hendersonville, TN (US) 37075

( * ) Notice: Subject to any disclaimer, the term of this patent is extended or adjusted under 35 U.S.C. 154(b) by 0 days.

(21) Appl. No.: 09/702,541

(22) Filed: Oct. 31, 2000

(51) Int. Cl.[7] .............................. B65D 73/00
(52) U.S. Cl. ........................ 206/347; 206/820
(58) Field of Search ............... 206/338, 343–347, 206/443, 820; 89/35.01; 411/442–444

(56) References Cited

U.S. PATENT DOCUMENTS

| | | | | |
|---|---|---|---|---|
| 3,097,360 A | * | 7/1963 | Carlson, Jr. et al. | 206/343 |
| 3,414,123 A | * | 12/1968 | Litt et al. | 206/820 |
| 5,041,317 A | * | 8/1991 | Greyvenstein | 206/820 |
| 5,224,597 A | * | 7/1993 | Hauchard | 206/345 |
| 5,279,201 A | * | 1/1994 | Jena et al. | 89/35.01 |
| 5,758,768 A | * | 6/1998 | Habermehl et al. | 206/347 |
| 5,811,717 A | * | 9/1998 | Day et al. | 206/347 |
| 5,927,163 A | | 7/1999 | Habermehl et al. | |

OTHER PUBLICATIONS

Photocopy of a sample of Quik Drive Brand Screwstrip as sold in the United States prior to Oct. 31, 1999.

* cited by examiner

Primary Examiner—Luan K. Bui
(74) Attorney, Agent, or Firm—Dorsey & Whitney LLP (57) ABSTRACT

A plastic screwstrip has a holding strip carrying a plurality of screws in a side-by-side relation as adapted for feeding, into an autofeed screwdriver. To assist in identifying which of two distal ends of the screwstrip are to be fed into the screwdriver and to assist in guiding the entry of the holding strip therein, a guide section of the holding strip forward of the first screw to be driven is provided at its front lead end with an arrow shaped forwardmost portion.

20 Claims, 10 Drawing Sheets

ARROW HEAD SCREWSTRIP

SCOPE OF THE INVENTION

This invention relates to collated screwstrips comprising a holding strip, preferably of plastic, retaining a plurality of screws in a row and, more particularly, to such screwstrips of relatively short discrete Length.

BACKGROUND OF THE INVENTION

Screwstrips are known wherein the screws are connected together by a retaining belt preferably of plastic material and adapted to be fed into an autofeed screw fastening tool and successively driven from the belt as the screwstrip is advanced through the tool. Known screwstrips of this type include those referred to and disclosed in the present applicant's U.S. Pat. No. 5,758,768, issued Jun. 2, 1998 and U.S. Pat. No. 5,927,163, issued Jul. 27, 1999, the disclosures of which are incorporated herein by reference. Such screwstrips are adapted to be driven in autofeed screwdrivers, such as taught by the applicant's U.S. Pat. No. 5,568,753, issued Oct. 29, 1996, U.S. Pat. No. 5,934,162, issued Aug. 10, 1999 and U.S. Pat. No. 5,870,933, issued Feb. 16, 1999, the disclosures of which are incorporated herein by reference.

Such screwstrips in one form are disposed in a helical coil containing, for example, up to 500 screws to be placed in a canister to retain the screwstrip and from which canister, a lead end of the screwstrip is placed into the autofeed screwdriver and advanced thereto to drive successive screws.

To avoid a user carrying the weight of the coil and canister, the present inventor has pioneered the use of such screwstrips of shorter discrete length, for example, 12 inches (30 cm), as taught by the aforementioned U.S. Pat. No. 5,758,768. Screwstrips of discrete length have two distal ends.

The present inventor has appreciated a disadvantage which arises is that users have difficulty in appreciating that, with many known screwstrips, proper loading into the autofeed screwdriver requires the correct one of the two distal ends to be inserted. Loading the incorrect distal end of the screwstrip into the autofeed screwdriver results in inoperation, jamming and/or mechanical failure of the autofeed screwdriving tool.

The present inventor has appreciated that short length screwstrips have two ends which a user may consider for feeding as a lead end into an autofeed screwdriver, however, that with many screwstrips, only one end can correctly be fed. The present inventor has appreciated that no easily discernable distinction arises between the two ends of the screwstrip.

The present inventor has also appreciated that difficulties can arise in loading the correct end of the screwstrip into the autofeed screwdrivers by reason of the distal lead end of the screwdriver engaging various surfaces in the autofeed screwdriver.

SUMMARY OF THE INVENTION

To at least partially overcome these disadvantages of previously known devices, the present invention provides a screwstrip with a front end of the holding strip having a forwardmost portion of reduced size compared to the remainder of the holding strip.

An object of the present invention is to provide a screwstrip with a holding strip having a front end with a shape which renders it visually apparent to a user that such end is the end to be fed into the autofeed screwdriving tool.

Another object is to provide a front end to the holding strip which facilitates passage of the end into an autofeed screwdriver.

Another object is to provide a screwstrip of finite length with two distal ends, one being a front end and the other being a rear end, the rear end having a configuration which renders it visually apparent to a user that the rear end is not the end to be inserted into an autofeed screwdriver.

Another object is to provide a screwstrip with a rear distal end which is configured to resist or prevent insertion of the rear distal end into an autofeed screwdriver.

Another object is to provide a method of manufacture of a screwstrip of discrete length by extruding a plastic holding strip onto the screws and cutting the strips such that a front edge has a first profile and the rear edge has a complimentary second profile.

Accordingly, in one aspect, the present intention provides a collated screwstrip comprising a holding strip and a plurality of fasteners, each fastener disposed about an axis and having a head at an upper end, a tip extending from the other end and a shank extending from below the head to the tip about the axis, the holding strip holding the fasteners in a rose in spaced side-by-side relation with the axis of the fasteners in the common plane, the holding strip comprising an elongate beam member which extends axially relative the fasteners and longitudinally between the fasteners, the holding strip extending longitudinally from a front end to a rear end, the holding strip having a width measured parallel the axis of the fasteners in a common plane;

a guide section of the holding strip at the front end extending longitudinally between the front end and a first fastener held by the holding strip rearward from the front end;

the width of the holding strip over a forwardmost portion of the guide section tapering to reduce towards the front end.

In another aspect, the present invention provides a method of forming screwstrips, wherein each screwstrip is of a fixed discrete length and having an array of screws of a predetermined number equally spaced therealong, the method comprising forming a screwstrip of a length to have a plurality of such arrays of screws along its length, each array spaced from an adjacent array by a length of the holding strip which does not carry screws, cutting the holding strip between the arrays along a cut line of a profile to provide on one side of the cut line a forward end of one screwstrip which tapers in width forwardly to a forward end and on the other side of the cut line a rear end of the another holding strap which is bifurcated over its width having a notch formed therein opening rearwardly from the cut line.

Further aspects and advantages of the present invention will appear from the following description taken together with the accompanying drawings, in which:

DETAILED DESCRIPTION OF THE DRAWINGS

Figure 1:
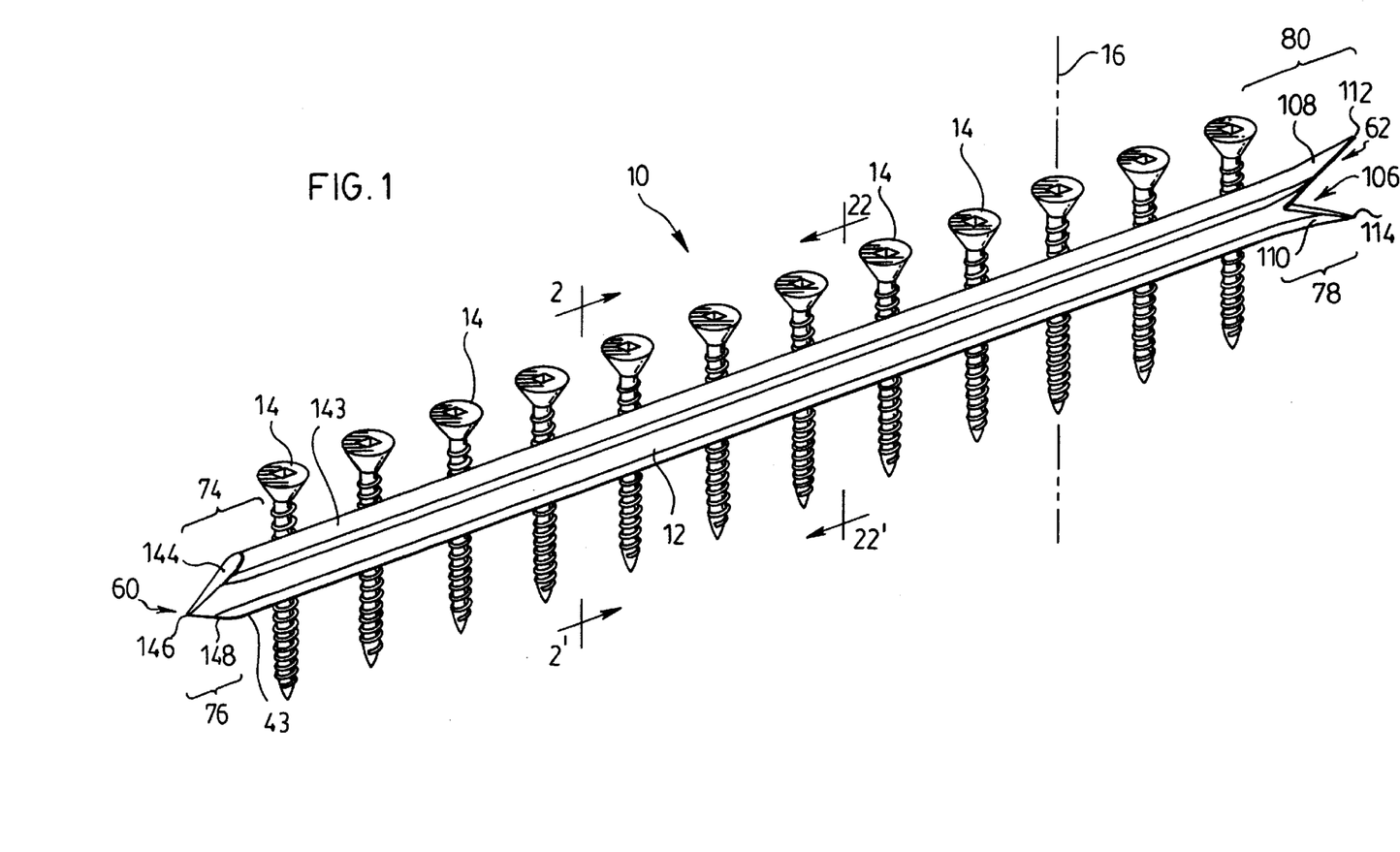
FIG. 1 is a pictorial view of a screwstrip in accordance with the first emnbodiment of the present invention.
Figure 2:
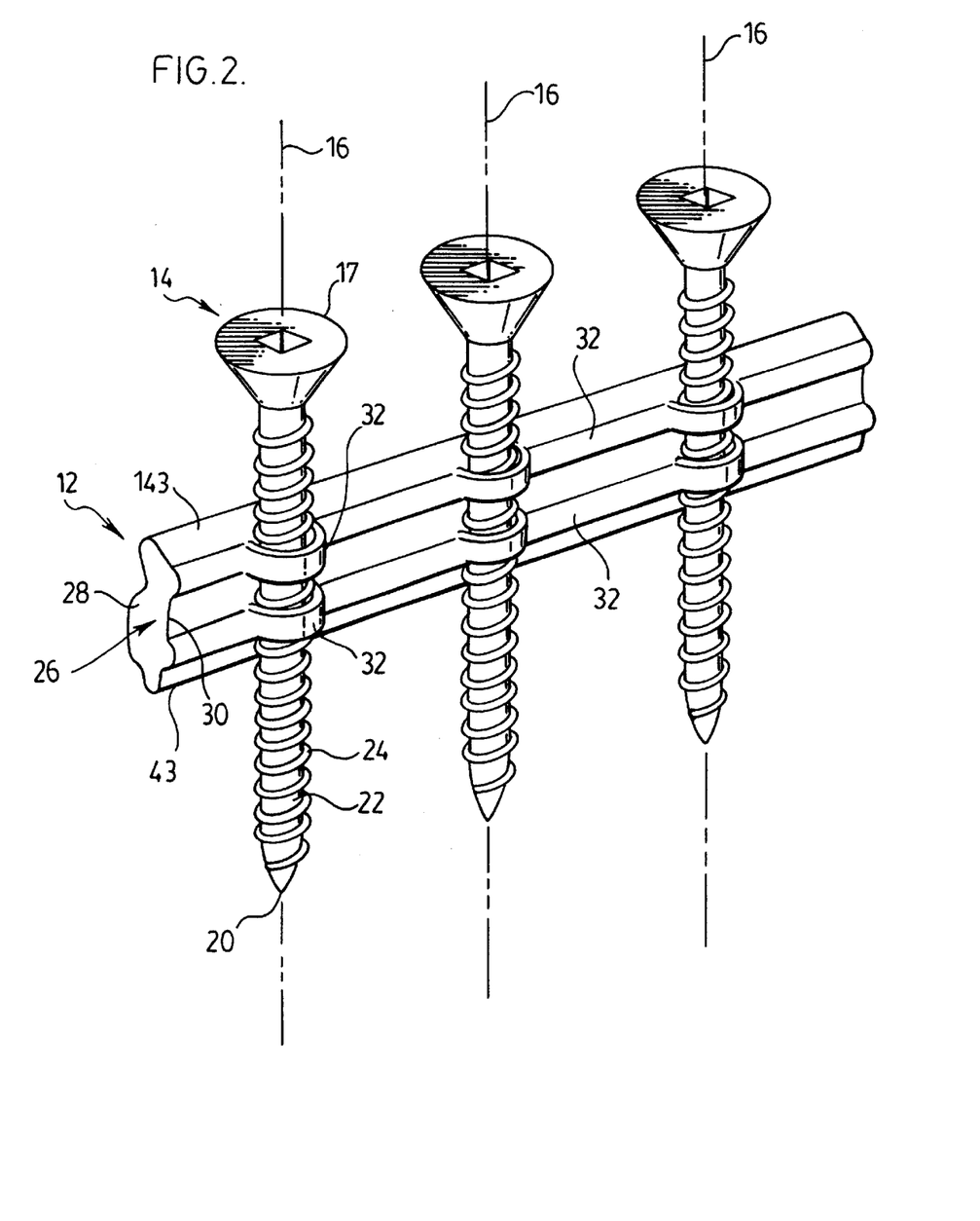
FIG. 2 is a pictorial view of a short length of the screwstrip of FIG. 1 between section line 2–2' and 22–22' and showing; the other side of the screwstrip not shown in FIG. 1.
Figure 3:
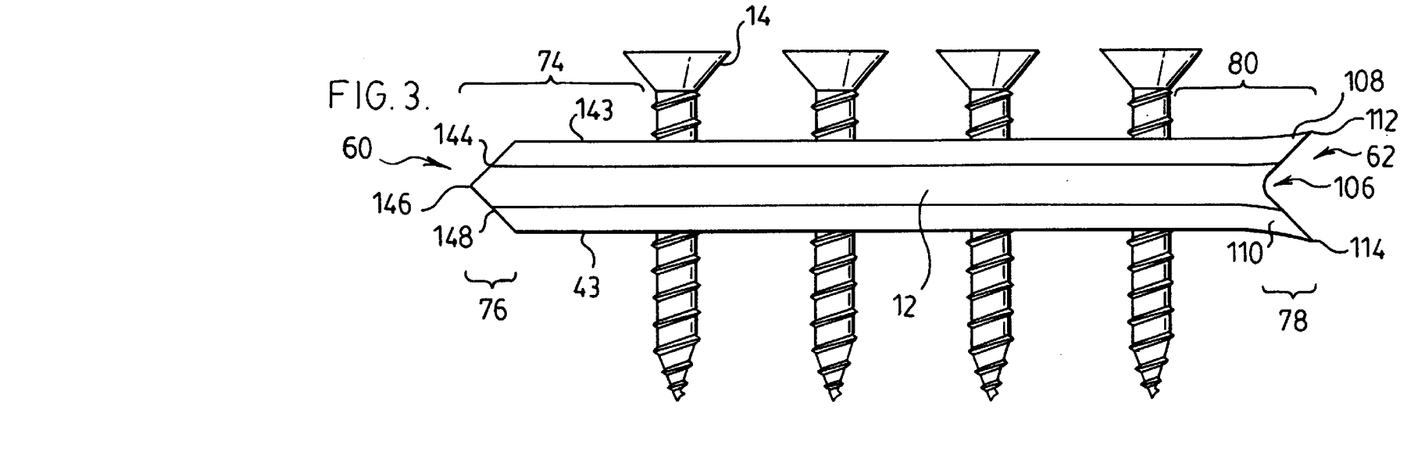
FIG. 3 is a schematic side view of the screwstrip of FIG. 1.

Reference is made first to FIGS. 1 to 3 which show a first embodiment of a screwstrip in accordance with the present invention and illustrate a screwstrip as disclosed in U.S. Pat. No. 5,758,768 modified however to provide an arrow head shaped forwardmost portion 76 of a guide section 74 at a front end 60 of the holding strip 12 and a preferred, bifurcated, double-fin shaped rearwardmost portion 78 of a terminal section 80 at a rear end 62 of the holding strip 12.

Figure 5:
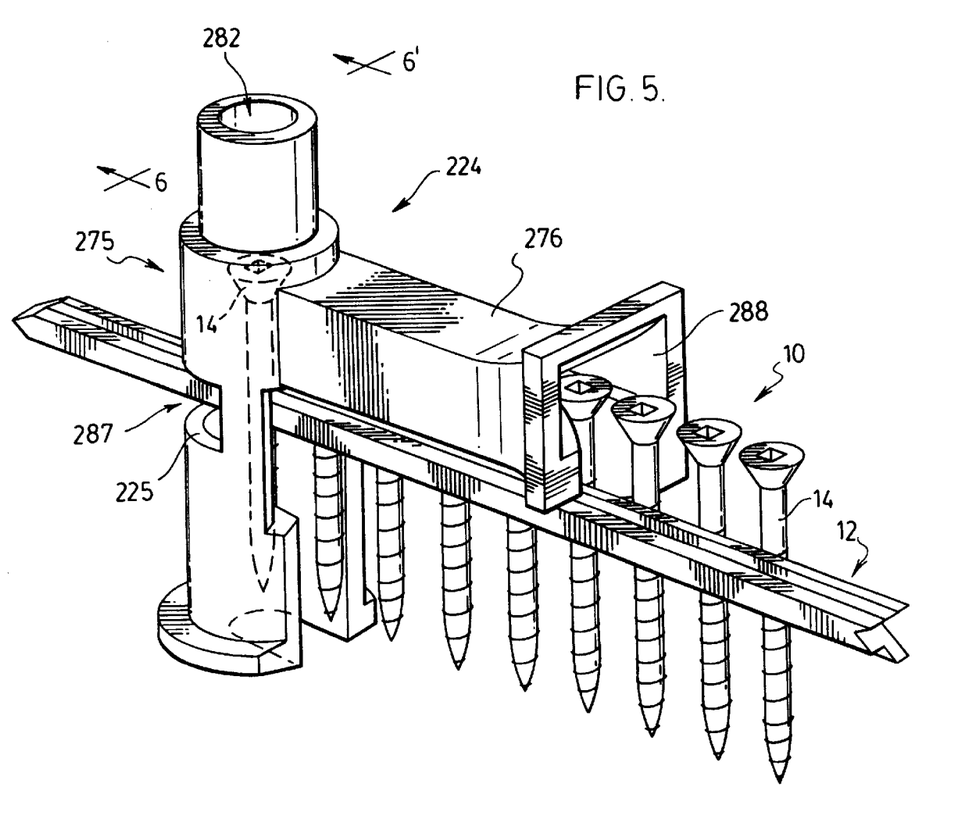
FIG. 5 is a schematic pictorial view showing a second embodiment of a screwstrip similar to that shown in FIG. 1 passing through a nose portion of an autofeed screwdriver.
Figure 6:
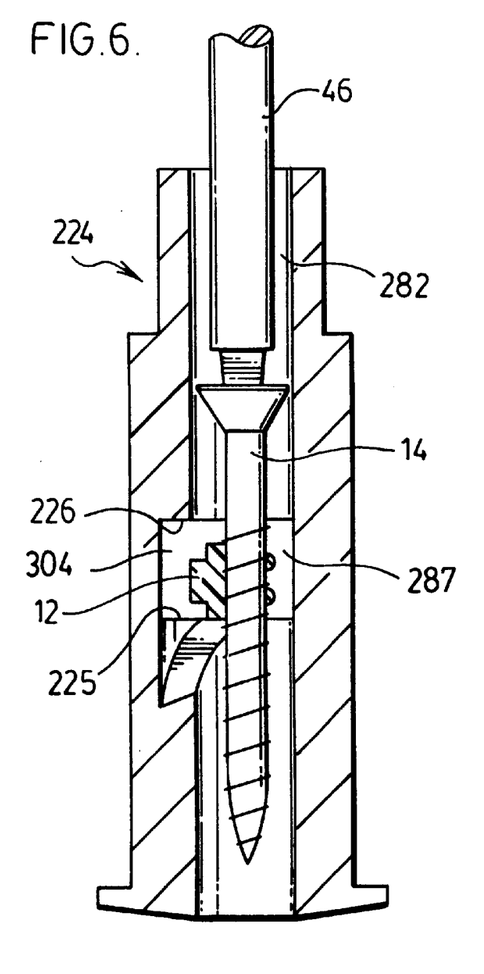
FIG. 6 is a cross-sectional view along section line 6–6' in FIG. 5, prior to the screw being driven and showing a driver shaft.

The arrow shaped forwardmost portion 76 of the guide section 74 serves to assist in guiding the screwstrip through a nose portion 224 of the autofeed screwdriving tool as shown in FIG. 5. A bifurcated, double-fin shaped rearwardmost portion 78 of terminal section 80 serves to resist guiding of the screwstrip through the nose portion 224 of the autofeed screwdriving tool should a user attempts to insert the screwstrip incorrectly, that is, with the rear end 62 inserted first.

The shape of the guide section 74 visually identifies to a user that it is a lead end to be inserted first. The shape of the terminal section 80 visually indicates to a user that it is not a lead end to be inserted. The combination of the shape of the guide section 74 and the shape of the terminal section 80 visually identifies to a user, particularly in comparison of the guide section 74 with the terminal section 80 that the guide section 74 is to be inserted first into the tool.

Reference is made to FIGS. 1 to 3 which shows a collated screwstrip in accordance with the present invention generally indicated 10 and comprising a holding strip 12 carrying a plurality of screws 14. The holding strip 12 comprises an elongate thin band of plastic, preferably thermoplastic material. The screwstrip 10 of FIG. 1 comprises a complete screwstrip of discrete length carrying twelve screws.

Each screw 14 is disposed about an axial central axis 16 and has a head 17 at an upper end, a tip 20 extending from the other lower end and a shank 22 extending from the head to the tip about the axis 16. The shank 22 carries threads 24.

The screws 14 are carried on the holding strip 12 evenly spaced from one another. In the embodiment shown in FIGS. 1 to 3, while not necessary, the axis 16 of each screw is parallel the axis of each other screw. The axes 16 of all the screw lies in a common plane, which is planar and extends centrally through each screw.

The holding strip 12 comprises an elongate beans member 26 which is generally disposed on one side of the common plane, which side is referred to herein as the beam or outboard side. The other side is referred to herein as the strap or inboard side. The outboard side is designated by numeral 28 in FIG. 2 and the inboard side is designated by numeral 30.

For each screw 14, two fragile strap members 32 are provided to secure the screw to the beam member 26. The straps 12 bridge the beam member 26 across the shank 22 so as to extend from the beam member 26 to pass around the shank 22 on the inboard side 30 of the shank.

Each strap 32 is sized so as to extend radially from the shank 22 beyond the radial extent of the threads such that where a strap 32 traverses a thread 24, the strap 32 is not severed.

The threads 24 on the outboard side of each screw 14 preferably are engaged in grooves in an inboard surface of the beam member 26.

The beam has an uppermost surface 143 and a lowermost surface 43. The beam has a width measured as the distance between the upper surface 143 and lower surface 43 parallel the axes of the screw. The beam has a depth measured from outboard surface 28 to inboard surface 30 normal to the central plane in which the axes of the screws lie.

Reference is made to FIG. 5 which shows a nose portion 224 of a driver attachment for driving collated screws similar to that taught by the applicant's U.S. Pat. No. 5,568,753, issued Oct. 29, 1996. The nose portion 224 comprises a guide tube 275 and a feed channel element 276 extending radially from the guide tube 275 such that screws in a screwstrip are advanced via the feed channel element 276 into a guideway 282 extending through the guide tube 275 in which they are axially aligned with a driller shaft 46 to drive successive screws. The guide tube 275 has an exit opening 287 through which the spent strip from which screws have been driven exits the guideway.

The exit opening 287 has an upwardly directed surface 225 adapted to engage the lower surface 43 of the holding strip 12 on the exit side of a screw being driven to assist in alignment of a screw to be driven by a bit carrying driver shaft 46 to be advanced into the guideway and drive a screw downwardly as shown in FIG. 5. In use, the beam, member 26 deflects laterally to the left as seen in FIG. 7 into a lateral slotway 304 forming part of the exitway and out of the way of the head 17 of a screw as the screw is driven down through the guideway.

Figure 7:
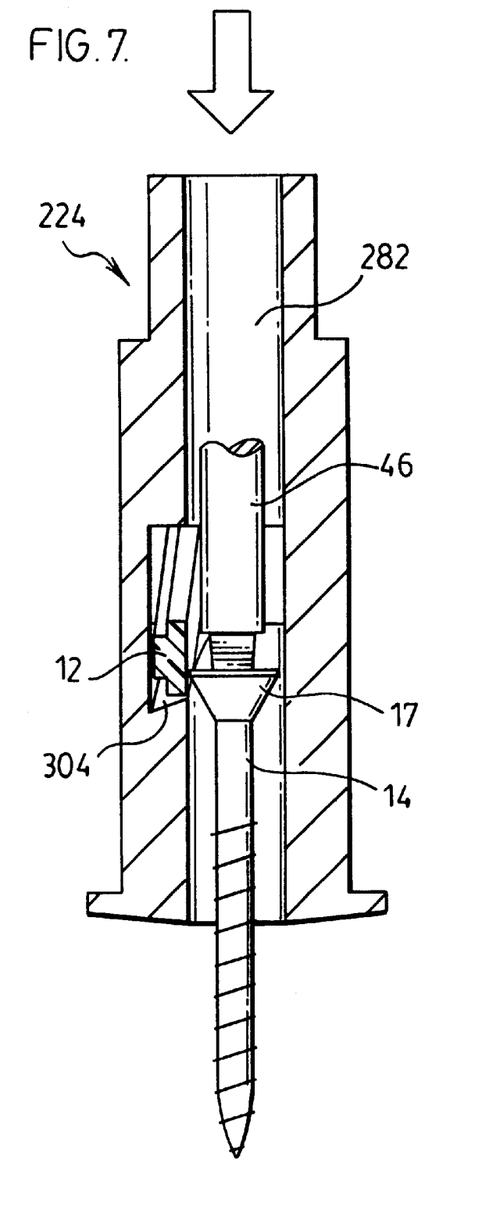
FIG. 7 is a cross-sectional view similar to that of FIG. 6, however, showing a screw as the head of the screw is driven by the driver shaft past the holding strip.

The nose portion 224 is configured with its lateral slotway 304 on the left hand side, amongst other things so that it will only drive a screwstrip which is inserted with the beam member 26 on the left hand side of the screw 14 as seen in FIG. 7.

In use, a screw 14 in the holding strip 16 is fed into a position in axial alignment with a reciprocating and rotating screwdriver bit 46 with the beam member 26 of the holding strip held against movement towards a workpiece as by the surface 225 of the exit opening 287 engaging the lower surface 43 of the holding strip. The screwdriver bit 46 engages the head 17 of the screw 14 and rotates the screw driving it forwardly into the workpiece. By reason of the threads 24 on the shank 22 being threadably engaged with the holding strip, the screw on rotation is driven downwardly relative the holding strip with the holding strip in effect serving to guide the screw into initial engagement with the workpiece. Further rotation of screw 14 engaged in both the workpiece and the holding strip draws the screw down into the workpiece until the head 17 of the screw engages the beam member 26 of the holding strip. With further rotation of the screw with the beam member 26 held against movement towards the workpiece, the head 17 of the screen passes through the holding strip rupturing the fragile straps 32 yet leaving the beam member 26 as a continuous length. Thereafter, the screw is driven fully into the workpiece. Since the screw is captured between the workpiece and the screwdriver bit 46, for the screw to move past the holding strip, the straps 32 must be broken and the beam member 26 must deflect away from the screw head in a direction normal the central plane in a manner as illustrated in FIG. 7 with the holding strip 12 deflected lateral into lateral slotway 304.

The holding strip is preferably configured to increase the likelihood that on the head 17 of the screw engaging the holding strip, the holding strip will be deflected radially away from the screw without the undersurface of the head 17 catching on the holding strip.

As seen in FIGS. 1 to 5, the holding strip 12 has a guide section 74 at the front end of the strip 12 between the front end 60 and the first screw to be driven, being the first screw rearward from the front end 60 and closest to the front end. The guide section 74 has a forwardmost portion 76 which has a shape and profile different than the remainder of the holding strip 12. The holding strip 12 generally has a cross-section of constant shape including width and depth along its length, particularly between the screws.

The forwardmost portion 76 has an arrow head shape with an upwardly and forwardly directed generally linear surface 144 extending from the apex 146 rearwardly to the upper surface 143 and a downwardly and forwardly directed generally linear surface 148 extending from the apex 146 rearwardly to the lower surface 43 symmetrically about a longitudinal center between the upper and lower surfaces 143 and 43. The width of the forwardmost portion 76 reduces forwardly to the apex 146.

The surfaces 144 and 148, which angle to the longitudinal, form camming surfaces to assist in guiding the guide section 74 of the front end of the holding strip 12 through the nose portion 224. In particular, the exit opening 287 is defined between its lower surface 225 and an upper surface 226. Provided the apex 146 commences to extend between the lower surface 225 and the upper surface 226, the camming surfaces 144 and 148 of the forwardmost portion will engage the lower surface 225 or upper surface 226, respectively and on forward insertion of the holding strip 12, cam the guide section 74 to pass through the exit opening 281.

The forwardmost portion 74 in the embodiment of FIGS. 1 to 3 is also shown to taper forwardly over its forwardmost portion having regard to its depth as measured normal to the central plane in which the axes of the screw lie with the depth between the inboard and outboard surfaces 28 and 30 reducing with increasing proximity to the front end 60.

As contrasted with the guide section 74 at the front end 60 of the strip 12, the tail or terminal section 80 has a configuration to be distinguished from the guide section 74 and which resists insertion into the nose portion 224.

The terminal section 80 has a rearwardmost portion 78 at the rear end 62 of the holding strip 12. The terminal section 80 is defined at the rear end of the strip 12 between the rear end 62 and the last screw to be driven, being the last screw rearward from the first end and the strew closest to the rear end 62. The rearwardmost portion 78 has a shape aid profile different from the remainder of the holding strip 12. As seen in FIG. 1, the rearwardmost portion 78 has a notch 106 formed therein open rearwardly between two rearwardly extending fins 108 and 110. The upper fin 108 merges with the upper surface 143 and the lower fin 110 merges with part of the lower surface 43. The fin 108 tapers rearwardly to its apex 112. The fin 110 tapers rearwardly to its apex 114. Preferably, the apex of the two fins 108 and 110 are spaced a distance greater than the typical width of the holding strip 12. The rearwardmost portion 78 preferably has a width at least marginally greater than the typical width of the holding strip, although this is not necessary.

The fins 108 and 110 resist entry of the terminal section 80 of the holding strip 12 into the nose portion 224 of the autofeed screwdriver as by catching on the upper or the lower surfaces 225 and 226 of the exit opening 287.

As well, the visual appearance of the terminal section 80 is such that it is appreciated by a user as not being the end of the holding strip to be inserted into an autofeed screwdriver when viewed by itself and particularly as compared with the appearance of the guide section 74.

Figure 4:
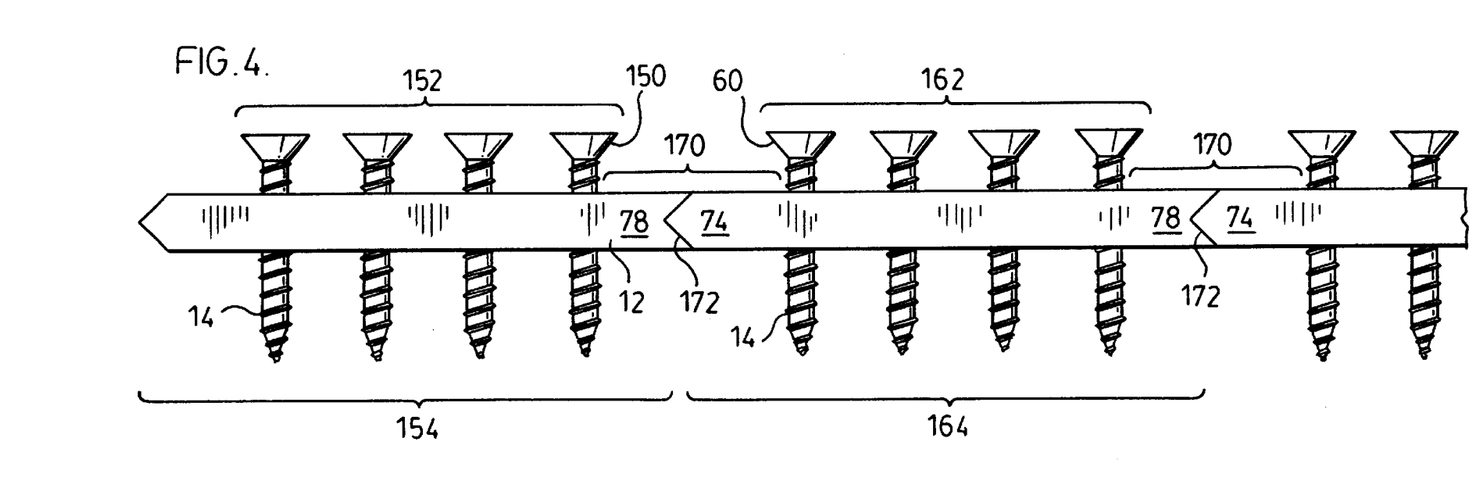
FIG. 4 is a schematic side view of portions of a screwstrip of the type shown in FIG. 1 showing a rear segment of one screwstrip as joined to a forward segment of the other screwstrip which are in the location of a cut to be made to separate the two strips.

Reference is made to FIG. 4 which illustrates a length of a screwstrip similar to that shown in FIG. 1 before cutting into individual screwstrips and therefore formed to be of greater length than that desired for each individual screwstrip. The last screw 150 of a first array 152 of equally spaced screws for a first screwstrip 154 and the first screw 160 of a second array 162 of equally spaced screws for a second screwstrip 164 are spaced by a length 170 of the holding strip 12 which does not contain screws. The length 170 is preferably selected to be a distance which is an integral number of the spacing between the axis of adjacent screws as, for example, by eliminating one, two, three or more normally spaced screws from the holding strip. Between the last screw and the first screw, the strip 12 is shown as to be cut as by a cut line 172 shown as V-shaped cut so as to sever the holding strip 12 at the cut line and form an arrow shaped forwardmost portion 76 on the second screwstrip 164 and a complimentary shaped notched, double finned rearwardmost portion 78 on the other first screwstrip 154. Preferably, in cutting the holding strap at the cut line, the double finned rearwardmost portion 78 will at least slightly be compressed to flatten the fins and urge them to expand upwardly and downwardly to increase the overall width of the rearwardmost portion. Preferably, the forward most portion 76 is cut to draw the holding strip forwardly and further taper the forwardmost portion 76 forwardly in width and in depth. Preferably, the holding strip is formed by a high-speed extrusion holding the screws and extruding the beam 26 on one side of the screws and the straps 32 on the other side. Cutting dies of desired shape can quickly cut the strap into discrete length while the strap is still relatively warm from the extrusion.

Figure 8:
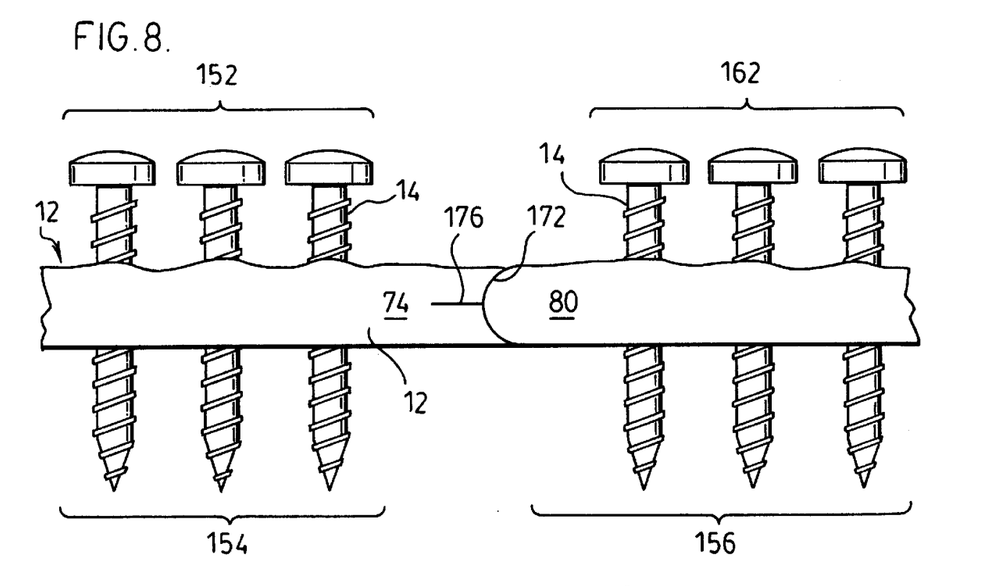
FIG. 8 is a cross-sectional view similar to that of FIG. 4, however, showing a third embodiment of a screwstrip in accordance with the present invention.
Figure 9:
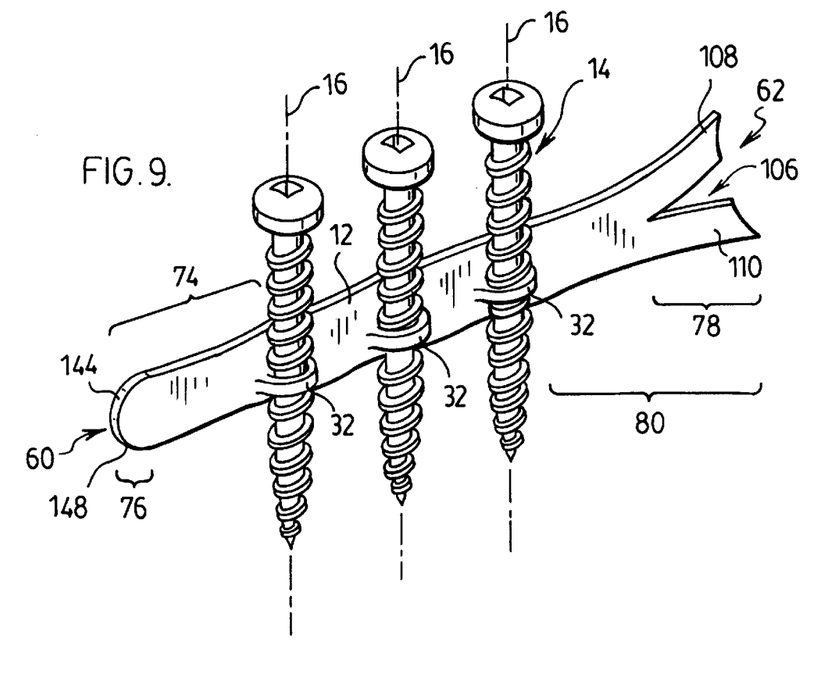
FIG. 9 is a pictorial view of a screwstrip as shown in FIG. 8.
Figure 10:
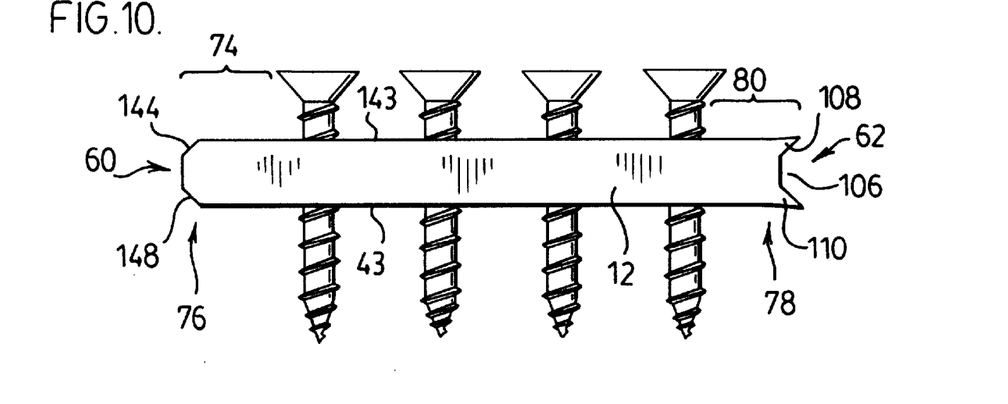
FIGS. 10 to 14 are side views of screwstrips showing different configurations of guide and/or terminal sections.

Reference is made to FIGS. 9 and 10 which show a third embodiment of a discrete length screwstrip in accordance with the present invention. FIG. 8 shows a side view of a cut-line through the holding strap between the last screw and first screw of different screwstrips. The cut-line has an arcuate cut 172 which servers the holding strip 12 and, as well, has a longitudinally extending cut line 176. As seen in FIG. 9, after cutting the rearwardmost portion 78, the rearwardmost portion is deformed to spread the holding strip 12 about the longitudinal cut line 176 and increase the size, spread and effective width of the fins 108 and 110.

Figure 11:
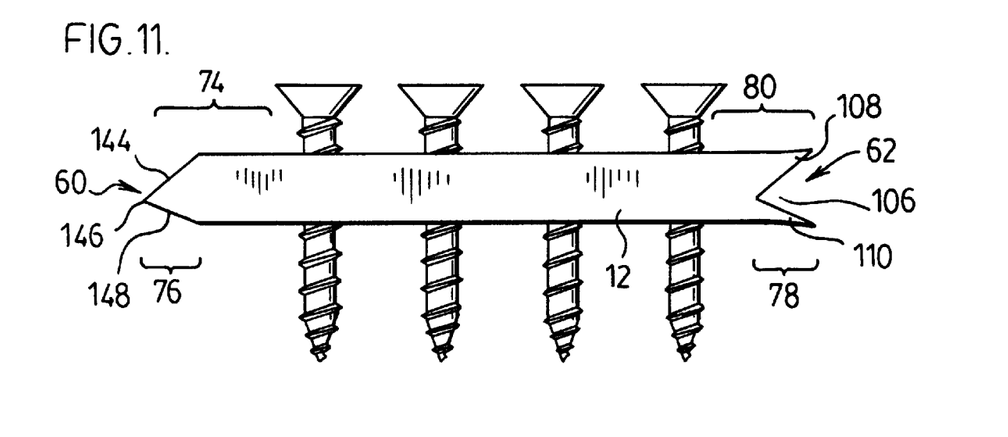
Figure 12:
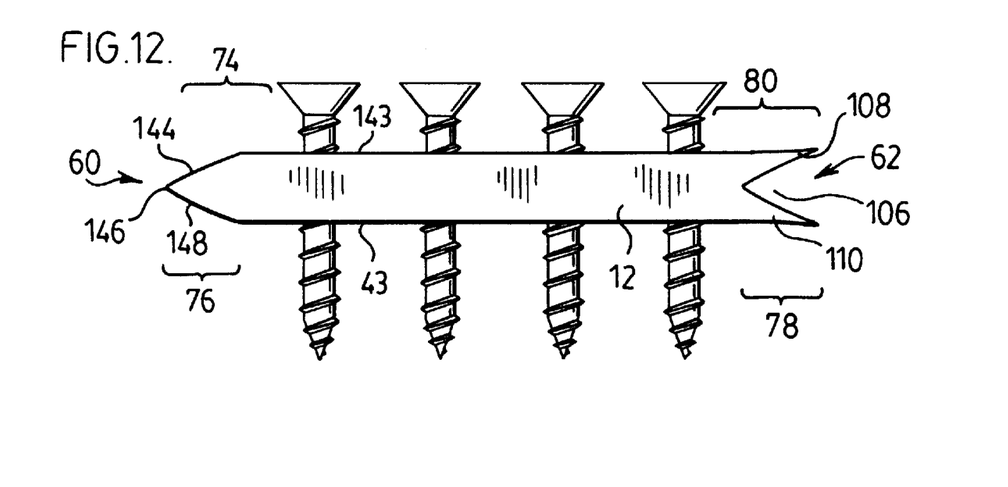
Figure 13:
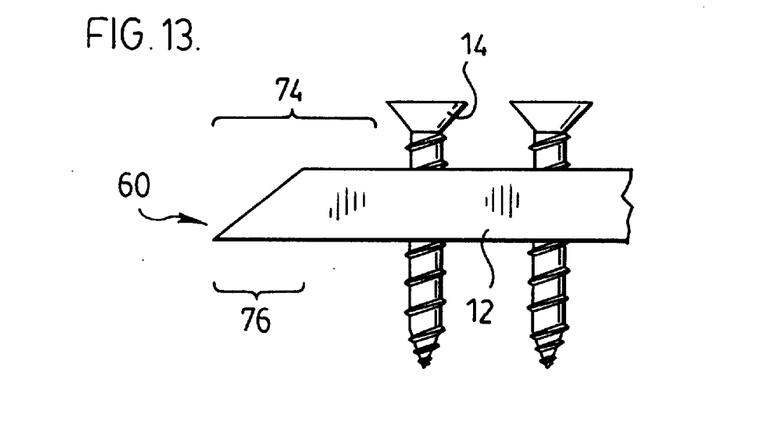

FIGS. 10 to 13 show various different configurations for the forwardmost portion 76 and the rearwardmost portion 78. The configurations of FIGS. 10 and 12 are symmetrical about a longitudinal of the holding strip between its upper and lower surfaces 143 and 43. The configurations of FIGS. 11 and 13 are asymmetrical.

Figure 14:
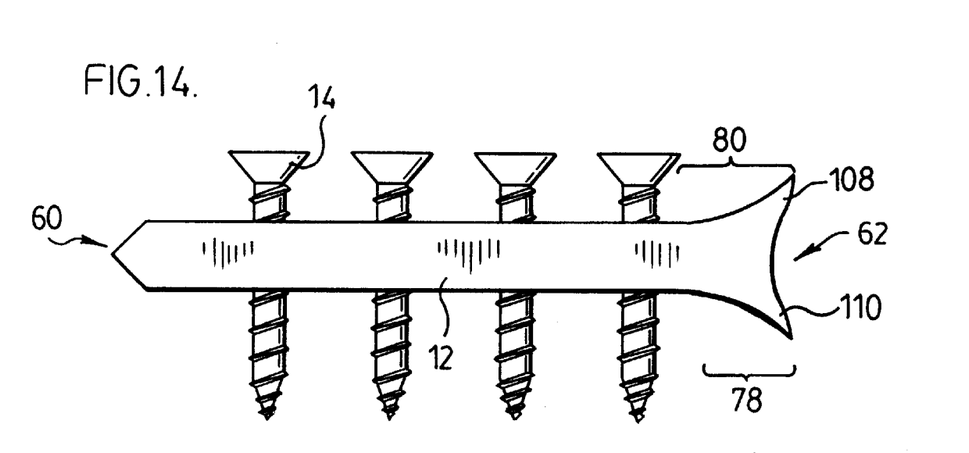
Figures 15, 16, 17:
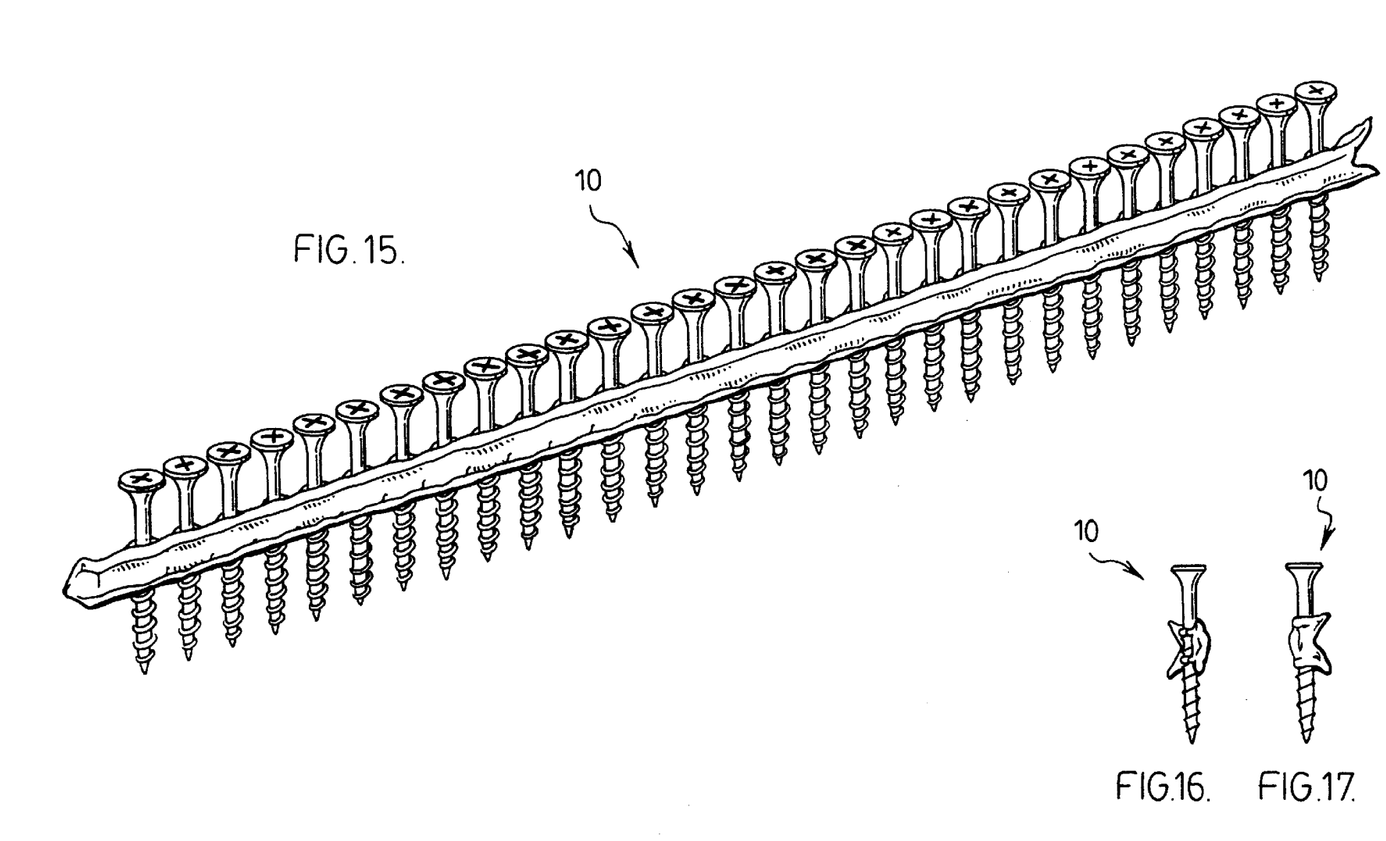
FIGS. 15 to 21 show partial, front end, rear end, first side, top, bottom and second side views of a fourth embodiment of the invention similar to the first embodiment.
Figure 18:
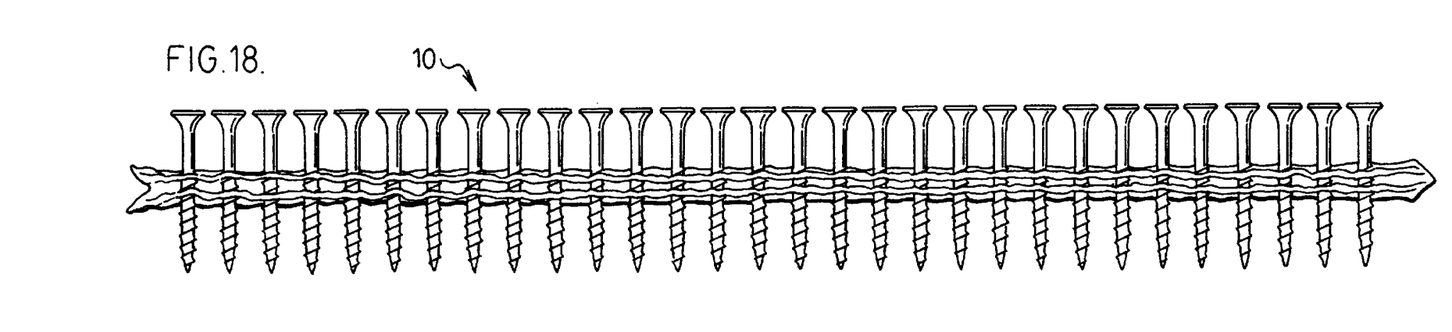
Figure 19:
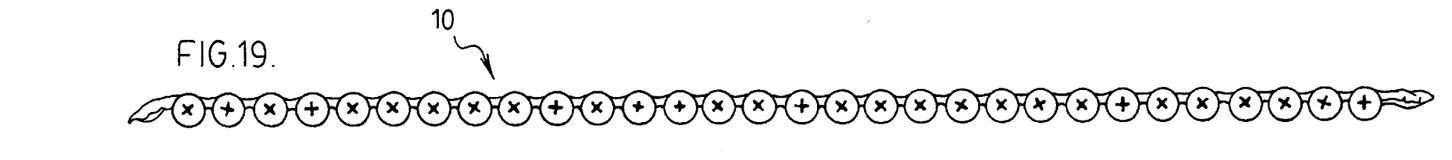
Figure 20:
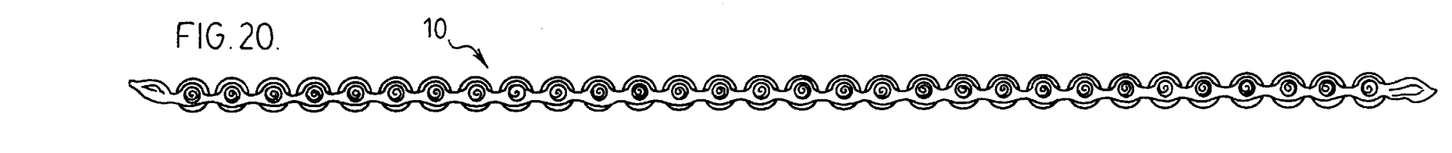
Figure 21:
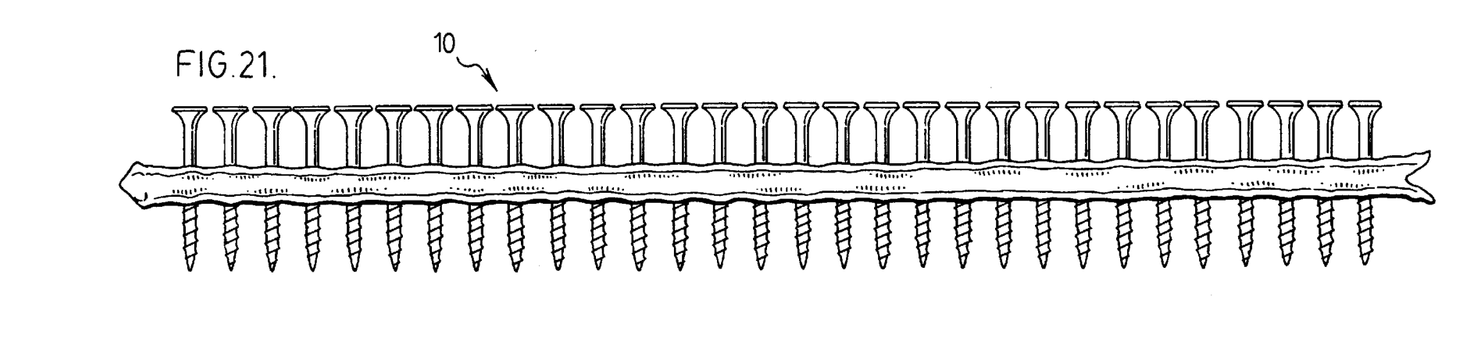

In accordance with the present invention, there is a manufacturing convenience and advantage to use a single cut so as to simultaneously form both a forwardmost portion of one screwstrip and a rearwardmost portion of a second screwstrip. This is not necessary. A forwardmost portion and a rearwardmost portion can be formed independently by separate processing. For example, an enlarged width rearwardmost portion could be formed by passing a rearwardmost portion of the plastic holding strip while still warm between a pair of rollers which would compress the holding strip from either side and increase the overall width in the manner of a enlarged tail like fin such as shown in side view in FIG. 14. As well, to the extent that the bifurcated tail like fins as shown in FIG. 1 may, either in a cutting process or in a separate step, be compressed by rollers applying pressures to the side of the fin then the fins will generally become extruded to increase the overall width of the rearwardmost portion 78 such as shown in side view in FIG. 14. Similarly, the forwardmost portion may be independently processed as by drawing the forwardmost portion forwardly and possibly providing it with a forwardmost conical configuration which would be adapted to provide camming surfaces about its entire circumference.

The width of the rearwardmost portion 78 may be increased to be greater than the comparable width of the exit opening 287 between surfaces 225 and 226 to provide a physical bar to insertion of the rear end 62. Therefore, in accordance with an aspect of the present invention, there is provided a combination of an autofeed screw driving tool with a nose portion with an exitway opening of predetermined width measured parallel the axis of the screws received therein and a screwstrip having a terminal section 80 of a width greater than the width of the exit opening 287 to resist the terminal end from being inserted. Insofar as the terminal end 80 has an enlarged width which tapers to increase in width rearwardly, then when the screwstrip is drawn on the proper direction through the nose portion 224, the enlarged width terminal portion should not due to its resiliency provide difficulties in being drawn forwardly through the exit opening 287.

The screwstrip of the present invention is configured as a screwstrip of discrete length and is particularly adapted to be self supporting in the sense that if the beam member 26 of the screwstrip is held at one end in a cantilevered fashion with the common plane vertical then the beam member has an appropriate size and configuration that having regard to the size and weight of the fasteners being held that the beam member supports the entire length without any undue or preferably any substantial vertical deflection.

The holding strip may be characterized as a web which extends axially relative the screws and between the screws. The web is elongated in height measured parallel the axis of the screws as contrasted with its width measured normal the common plane. The web carries sleeves formed by the straps and partially outboard into the web to receive the screws and lands joining the sleeves, which lands may have a varying width between sleeves. A reinforcing rib may be provided on the webs disposed on the outboard side of the web to reinforce and strength the web by providing increased width to the holding strip over the center of the web.

Preferred configurations of the holding strips are configurations in which the strip has spaced sleeves with one screw received in each sleeve with the head of the screw extending from one rear end of the sleeve and the tip of the screw extending from the other forward end of the sleeve; with the sleeve threadably engaging the threads on the shank of the screw; and with each sleeve having a reduced strength portion such that a screw on being threaded tip first into a workpiece is automatically separated from its sleeve while maintaining the length of the strip substantially intact and while guiding the fastener by threaded engagement of the fastener in its respective sleeve.

While the screwstrip 10 is shown in FIG. 1 as carrying threaded screws, it is to be appreciated that the fasteners need not be threaded fasteners and could comprise other fasteners such as nails, rivets, pins and the like.

The holding strip is preferably made of plastic material in all the other embodiments, however, this is not necessary and the holding strip could comprise other materials than plastic such as paper, cardboard, paper fiber, wire, metal, composites of all of these and the like.

It is preferred that the screwstrip 10, shown in FIG. 1 have all the screws lie in a common plane which is flat. However, the common plane may be curved as, for example, with the common plane being part of a surface of a cone member. As well, the holding strip may extend longitudinally generally straight as shown or may be curved upwardly as shown in FIG. 16 of U.S. Pat. No. 5,758,768.

The embodiments of FIGS. 1 to 7 show two straps 32. This is not necessary. Only a single strap 32 need be provided as seeing in FIGS. 8 and 9. The straps 32 as shown are but a preferred form of a fragile strap member which serves a purpose of securing a screw to the beam member 26 for release of the screw. The strap member need not be continuous and could be split or comprise a sleeve or split sleeve as in the manner of that described in Canadian Patent 1,040,600 to Keusch et al., issued Oct. 17, 1978. The strap member is merely a portion of the holding strip which retains the screw with less resistance to release of the screw than the remainder of the holding strip.

The complete screwstrip 10 of FIG. 1 is shown as comprising 12 screws. Screwstrips may be of different lengths as may be convenient. Preferably, screwstrips may be in the range of about 6 inches to 20 inches in length, more preferably about 12 inches. For many typically sized screws including drywall type screws advantageous spacing between screw centers is about 3/8 inch and therefore a 12 inches strip may hold about 30 to 33 screws. FIG. 1 shows the screwstrip as having its front and rear ends 60 and 62 disposed about one half the distance between screws away from the last screw. Either or both of the terminal ends may extend beyond the last screw a greater distance to assist in initial advance into a power drive or to assist in a power driver driving the last screw.

In FIG. 7, the holding strip 12 extends as the guide section 74 to the left as seen, a distance from the end screw 14 about one and one half times the spacing between screws to front end 60. Preferably, the guide section is of a length from the axis of the first screw at least one and one half times the distance between axis of the screws, or two times this distance or two and one half times this distance. The terminal section 80 may be of a length equal to the guide section or preferably of a length less than that of the guide section. The guide section 74 provides an extension which assists in initial loading of the screwstrip into driver attachments and assists in locating the first screw to be driven within the drive attachment.

In the context of drivers which provide an exit opening, such as 287 in FIG. 5, from a nose portion through which the spent holding strip is to exit, the guide section 74 advantageously, on initial loading of the screwstrip, is long enough to extend out through the exit opening and ensure that in subsequent advance, the spent strip properly exits the nose portion. In the context of drivers which support the screwstrip by engaging the lower strip surface 43 on the exit side of a screw to be driven, the guide section 74 provides this surface 43 on the exit side of the first screw at a sufficient distance to the left as shown to be engaged by a rearwardly directed surface of a driver, such as, for example, surface 225 in FIG. 5.

The embodiments shown illustrate the common plane as being a flat planar plane. The common plane need not be flat and cold for example be linear in a direction parallel the screws, and curve when seen in a cross-section normal the screws.

The embodiments shown show a typical wood screw as but an illustrative threaded fastener. Many other threaded fasteners may be utilized including fasteners with or without washers and fasteners for driving with sockets and other tools.

The invention has been described with reference to preferred embodiments. Many modifications and variations will now occur to persons skilled in the art, For a definition of the invention, reference is made to the appended claims.

We claim:

1. A collated screwstrip comprising a holding strip and a plurality of threaded fasteners, each fastener disposed about an axis and having a had at an upper end, a tip extending from the other end and a shank extending from below the head to the tip about the axis with threads about the shank;

the holding strip holding the fasteners in a row in spaced side-by-side relation with the axis of the fasteners in a common plane;

the holding strip comprising an elongate beam member which extends axially relative to the fasteners and longitudinally between the fasteners;

the holding strip extending longitudinally from a front end to a rear end and having an upper surface directed toward the heads of the fasteners and a lower surface directed toward the tips of the fasteners, the holding strip holding the fastener intermediate the head of the fastener and the tip of the fastener;

the holding strip having a width measured parallel the axis of the fasteners in the common plane between said upper surface and said lower surface;

a guide section of the holding strip at the front end extending longitudinally between the front end and a first fastener held by the holding strip rearward from the front end;

the width of the holding strip over a forwardmost portion of the guide section tapering from at least one of said upper surface and said lower surface to reduce towards the front end in a direction generally parallel to the common plane.

2. A screwstrip as claimed in claim 1, wherein the guide section tapering forwardly to a fowardmost apex.

3. A screwstrip as claimed in claim 1 in which the guide section tapering a symmetrically relative the upper surface and lower surface forwardly to a forwardmost apex.

4. A screwstrip as claimed in claim 1, wherein the holding strip having a thickness measured normal to the common plane, the thickness of the holding strip over the forwardmost portion of the guide section tapering to reduce towards the front end.

5. A screwstrip as claimed in claim 1, including a tail section of the holding strip at the rear end extending longitudinally between the rear end and a last fastener held by the holding strip forward of the rear end.

6. A screwstrip as claimed in claim 5, wherein a rearwardmost portion of the tail section is bifurcated over its width.

7. A screwstrip as claimed in claim 5, wherein the holding strip having a generally constant width over its length between screws, a rearwardmost portion of the tail section having a width greater than the constant width.

8. A screwstrip as claimed in claim 1, wherein the holding strip having a generally constant width over its length between screws, a forwardmost portion of the guide section having a width less than the constant width.

9. A screwstrip as claimed in claim 5, wherein a rearwardmost portion of the tail section having a notch formed therein opening rearwardly between two rearwardly extending spaced fins, one fin adjacent an upper surface of the holding strip and the other fin adjacent a lower surface of tie holding strip, the two fins spaced from each other axially of the screws along the width of the holding strip.

10. A screwstrip as claimed in claim 9, wherein each fin tapers in width rearwardly to a rearwardmost apex.

11. A screwstrip as claimed in claim 10, wherein each fin is a mirror image of the other fin about a longitudinal center line extending longitudinally between the upper surface and a lower surface.

12. A screwstrip as claimed in claim 5, wherein the forwardmost portion of the guide section and the rearwardmost portion of the tail section fit together as substantially complimentary female and male parts, and wherein each of the forwardmost portion and rearwardmost portion have been formed by cutting a previously existing length of the holding strip along a single cut line having the same profile.

13. A screwstrip as claimed in claim 1, wherein the beam member is substantially on one, outboard side of the common plane and with, for each fastener, at least one fragile strap member bridging the beam member across the shank of its respective fastener and passing on the other inboard side of the common plane to retain the fastener on the beam member.

14. A screwstrip is claimed in claim 1, wherein the fasteners are held in the holding strip with the axis of the fasteners in parallel relation, the common plane is planar, the holding strip comprises plastic, and threads of the threaded shank engaging in corresponding thread grooves formed in the beam member.

15. A screwstrip as claimed in claim 14, wherein the holding strip having along its length an upper surface directed towards the heads of the fasteners and a lower surface directed towards the tips of the fasteners, the holding strip holding the shank of the fastener intermediate the head of the fastener and the tip of the fastener, the guide section tapering symmetrically relative the upper surface and lower surface forwardly to a forwardmost apex.

16. A combination as claimed in claim 1, wherein:

the fasteners comprise threaded fasteners with threads about the shank, the beam member carrying spaced sleeves with one of the fasteners received in each sleeve, each fastener received in each sleeve spaced a uniform distance from adjacent fasteners with the fastener's head extending from one rear end of the sleeve and the fastener's tip extending from the other forward end of the sleeve, the sleeve threadably engaging the threads on the shank, the sleeve having a reduced strength portion on one inboard side of each fastener, such that a fastener on being threaded tip first into a workpiece is automatically separated from its sleeve while maintaining the length of the strip substantially intact and while guiding the fastener by threaded engagement of the fastener in its respective sleeve.

17. A collated screwstrip comprising a holding strip and a plurality of threaded fasteners, each fastener disposed about an axis and having a head at an upper end, a tip extending from the other end and a shank extending from below the head to the tip about the axis with threads about the shank;

the holding strip holding the fasteners in a row in spaced side-by-side relation with the axis of the fasteners in a common place;

the holding strip comprising an elongate beam member which extends axially relative the fasteners and longitudinally between the fasteners;

the holding strip extending longitudinally from a front end to a rear end;

the holding strip having a width measured parallel the axis of the fasteners in the common plane;

a guide section of the holding strip at the front end extending longitudinally between the front end and a first fastener held by the holding strip rearward from the front end;

the width of the holding strip over a forwardmost portion of the guide section tapering to reduce towards the front end;

the beam member is substantially on one, outboard side of the common plane and with, for each fastener, at least one fragile strap member bridging the beam member across the shank of its respective fastener and passing on the other inboard side of the common plane to retain the fastener on the beam member, the fasteners are held in the holding strip with the axis of the fasteners in parallel relation, the common plane is planar;

the holding strip comprises plastic, and threads of the threaded shank engaging in corresponding thread grooves formed in the beam member;

the holding strip having along its length an upper surface directed towards the heads of the fasteners and a lower surface directed towards the tips of the fasteners, the holding strip holding the shank of the fastener intermediate the head of the fastener and the tip of the fastener;

the guide section tapering symmetrically relative the upper surface and lower surface forwardly to a forwardmost apex; and a tail section of the holding strip at the rear and extending longitudinally between the rear end and a last fastener held by the holding strip forward of the rear end, a rearwardmost portion of the tail section having a notch formed therein opening rearwardly between two rearwardly extending spaced fins, one fin adjacent the upper surface and the other fin adjacent the lower surface, the two fins spaced from each other axially of the screws along the width of the holding strip, each fin tapering in width rearwardly to a rearwardmost apex, and each fin being a mirror image of the other fin about a longitudinal center line extending longitudinally between the upper surface and a lower surface.

18. A collated screwstrip comprising a plastic holding strip and a plurality of threaded fasteners, each fastener disposed about an axis and having a head at an upper end, a tip extending from the other end and a shank extending from below the head to the tip about the axis with threads about the shank, the holding strip holding the fasteners in a row in spaced side-by-side relation with the axis of the fasteners in a common plane, the holding strip comprising an elongate beam member which extends axially relative the fasteners and longitudinally between the fasteners, the holding strip extending longitudinally from a front end to a rear end, the holding strip having a width measured parallel the axis of the fasteners in the common plane;

a guide section of the holding strip at the front end extending longitudinally between the front end and a first fastener held by the holding strip rearward from the front end;

the width of the holding strip over a forwardmost portion of the guide section tapering to reduce towards the front ends;

the holding strip having along its length an upper surface directed towards the heads of the fasteners and a lower surface directed towards the tips of the fasteners, the holding strip holding the shank of the fastener intermediate the head of the fastener and the tip of the fastener;

the holding strip having a tail section at the rear and extending longitudinally between the rear end and a last fastener held by the holding strip forward of the rear end;

the holding strip having a generally constant width over its length between screws, the rearwardmost portion of the tail section having a width greater than the constant width;

the forwardmost portion of the guide section having a width less than the constant width.

19. The screwstrip of claim 6 wherein a rearwardmost portion of the tail section having a notch formed therein opening rearwardly between two rearwardly extending spaced fins, one fin adjacent an upper surface of the holding strip and the other fin adjacent a lower surface of the holding strip, the two fins spaced from each other axially of the screws along the width of the holding strip.

20. The screwstrip of claim 19 wherein the forwardmost portion of the guide section and the rearwardmost portion of the tail section form complementary configurations.

* * * * *